(12) United States Patent
Andersson

(10) Patent No.: US 6,289,845 B1
(45) Date of Patent: Sep. 18, 2001

(54) MILKING EQUIPMENT AND A RELIEF DEVICE

(75) Inventor: Gösta Andersson, Södertälje (SE)

(73) Assignee: DeLaval International AB, Tumba (SE)

( * ) Notice: Subject to any disclaimer, the term of this patent is extended or adjusted under 35 U.S.C. 154(b) by 0 days.

(21) Appl. No.: 09/423,487
(22) PCT Filed: May 6, 1998
(86) PCT No.: PCT/SE98/00837
  § 371 Date: Dec. 6, 1999
  § 102(e) Date: Dec. 6, 1999
(87) PCT Pub. No.: WO98/51144
  PCT Pub. Date: Nov. 19, 1998

(30) Foreign Application Priority Data

May 9, 1997 (SE) .................................... 9701735

(51) Int. Cl.⁷ ....................................... A01J 7/00
(52) U.S. Cl. .................. 119/14.1; 119/14.08; 119/14.13
(58) Field of Search ............... 119/14.01, 14.1, 119/14.13, 14.18, 14.45, 14.47, 14.54

(56) References Cited

U.S. PATENT DOCUMENTS

| 1,239,407 | 9/1917 | Larsen . | |
| 3,605,694 | * 9/1971 | Thomas et al. | 119/14.1 |
| 3,861,355 | 1/1975 | Johnson et al. . | |
| 3,938,470 | * 2/1976 | Pace | 119/14.1 |
| 4,333,421 | * 6/1982 | Schluckbier | 119/14.08 |
| 4,491,085 | * 1/1985 | Rubino | 119/14.1 |
| 4,586,462 | * 5/1986 | Icking | 119/14.1 |

FOREIGN PATENT DOCUMENTS

| 1278166 | 9/1968 | (DE) . | |
| 2120020 | * 12/1971 | (DE) | 119/14.1 |
| 630556 | 5/1994 | (EP) . | |
| 331611 | 1/1971 | (SE) . | |
| 365930 | 4/1974 | (SE) . | |
| 559682 | * 7/1974 | (SU) | 119/14.1 |
| WO9613150 | 5/1996 | (WO) . | |

* cited by examiner

Primary Examiner—Peter M. Poon
Assistant Examiner—Son T. Nguyen
(74) Attorney, Agent, or Firm—Hovey, Williams, Timmons & Collins

(57) ABSTRACT

A milking equipment comprises a milking member (1) having teatcups (3) and a milk hose (4) connected to the milking member. A balancing device (6, 10, 11), which carries the milking member and at least a portion of the milk hose, is adjustable to an application position (FIG. 1), at which the balancing device is arranged to balance essentially the weight of the milking member and the weight of said portion of the milk hose in order to permit a milker to apply the teatcups to the teats of an animal without the need for the milker to carry the whole weight of the milking member. Furthermore, the balancing device is adjustable to a milking position, at which essentially the whole weight of the milking member acts on the teats of an animal when the teatcups are attached to the teats.

16 Claims, 4 Drawing Sheets

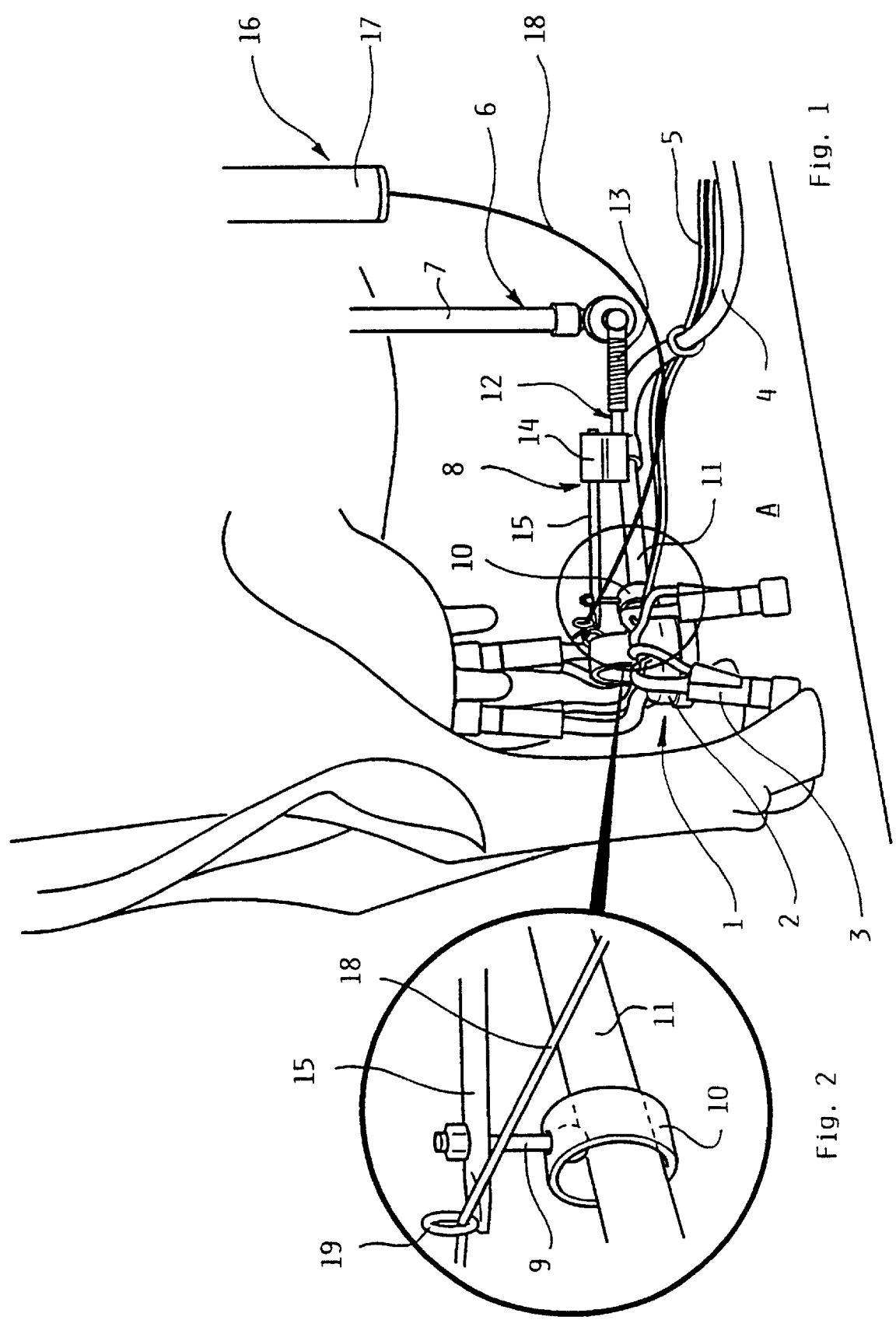

MILKING EQUIPMENT AND A RELIEF DEVICE

BACKGROUND OF THE INVENTION

1. Field of the Invention

The present invention refers to a milking equipment comprising a milking member having teatcups and at least one milk hose connected to the milking member. The invention also refers to a relief device for a milking equipment, which comprises a milking member, having a claw with a milk outlet nipple and teatcups connected to the claw, a milk hose connected to said milk outlet nipple, and a stationary support member, which has a vertical support shaft and an essentially horizontal support arm, which at its one end is connected to the support shaft and which at its other end carries at least a portion of the milk hose.

2. Description of the Prior Art

Freely walking cows are usually milked in a particular milking stall twice a day. Such a milking stall has a number of compartments for cows to be milked and is provided with a floor which is lowered in relation to the compartments and on which the milker may stand upright during the work with the attachment of the teatcups of a milking member to the teats of a cow. In order to enable the teatcup attachment, the milker keeps the milking member suspended by his one hand, wherein the arm is relatively extended in such a manner that the milking member is located in an appropriate position beneath the udder of the cow at the same time as the milker by his other free hand attaches the teatcups to the teats. However, the milker is in course of time subjected to the risk of getting stress injuries in the arm used to lift the milking member and in the shoulder of this arm, since the milking member is relatively heavy and it may be a great number of cows to be milked at each milking occasion. A conventional milking member, having four teatcups and a claw, has a weight of usually about four kilos. In addition, the milker has to lift a portion of the milk hose, hanging from the claw.

It is previously suggested to provide devices which may overcome the problem of stress injuries of the kinds defined above For instance, SE-B-331 611 discloses a support for the teatcups of a milking member, comprising a horizontal linkage member 5 having holders 8 for the teatcups. Thus, the support holds the milking member suspended in such a manner that both hands of the milker are free for the handling of the teatcups. However, the known support is relatively complicated and expensive and has not been commercialised.

DE-B-1278 166 discloses a support device comprising a horizontal cylinder 3 with a piston rod 4, wherein the piston rod has a free end intended to carry a milking member. The cylinder 3 is adjustable vertically by means of a vertical piston-cylinder member. However, this known support device is complicated and seems to give the milking member an insufficient freedom of movement beneath the udder of a cow when the teatcups are attached.

US-A-3 789 798 discloses an automatic teatcup remover having a horizontal support arm 32, 33, which at its one end is attached to a vertical shaft and which at its other end is arranged to carry a claw 45. Also this known teatcup remover is complicated and give the milking member an insufficient freedom of movement when its teatcups are attached.

SUMMARY OF THE INVENTION

An object of the present invention is to provide a milking equipment facilitating the attachment of the teatcups in such manner that the above-described problem of stress injuries is eliminated.

This object is obtained by means of a milking equipment of the kind initially defined and characterized in that the milking member and at least a portion of the milk hose are supported by a balancing device, adjustable to an application position, at which the balancing device is arranged to balance essentially the weight of the milking member and the weight of said portion of the milk hose in order to permit a milker to apply the teatcups to the teats of an animal without the need for the milker to carry simultaneously the whole weight of the milking member, and a milking position, at which essentially the whole weight of the milking member acts on the teats of an animal when the teatcups are attached to the teats.

The balancing device may be produced in a very simple and inexpensive manner. Preferably, it comprises an essentially horizontal balancing arm, which at its one end is attached to the milking member and which at its other end carries said portion of the milk hose, a pivot member, which carries the balancing arm, and a stationary support member, which supports the pivot member. Herein, the balancing arm is movable horizontally in relation to the pivot member between a first position, which corresponds to said application position and at which the pivot member is located relatively close to the milking member, and a second position, which corresponds to said milking position and at which the pivot member is located relatively far from the milking member.

Advantageously, the balancing device is arranged to permit the movement of the milking member between an operation position, at which the milking member is located in a milking space and is attachable to an animal present in said milking space, and a preparedness position, at which the milking member is located outside said space. The support member may comprise a vertical support shaft and an essentially horizontal support arm, which at its one end is connected to the support shaft and which at its other end is articulated to the pivot member. Thereby, the support arm may be rotated by means of the support shaft in such a manner that the milking member is movable between said operation and preparedness positions.

Suitably, the support arm is adjustable between a first position, at which the pivot member is located relatively far from the support shaft, and a second position, at which the pivot member is located relatively close to the support shaft. By the adjustability of the support arm, a proper adjustment of the milking member beneath the udder of an animal is enabled when the balancing device is adjusted to said application position. The support arm may comprise a first portion, which is connected to the support shaft, and a second portion, which is articulated to at the pivot member and which is displaceable along said first portion of the support arm.

The teatcups may be arranged to be removed from the teats of an animal after the milking is finished by means of an automatic teatcup remover. In such case, the teatcup remover is advantageously provided to move the milking member from the operation position to the preparedness position, when the teatcup remover has removed the teatcups from the teats of the animal. Moreover, the teatcup remover is advantageously arranged, during the movement of the milking member from the operation position to the preparedness position, to adjust the balancing device from the milking position to the application position. Usually, automatic teatcup removers have a drawing cord which is attached to the milking member. Suitably, such a drawing cord extends through a guide opening on the support arm at said other end of the support arm.

A further object of the present invention is to provide a relief device which reduces the risk for a milker to get stress injures during handling of a milking equipment.

This object is obtained by the relief device for a milking equipment of the type initially defined and which relief device is characterized by a tubular balancing arm, which is connectable between the milk outlet nipple of the claw and the milk hose in such a manner that the interior of the milk outlet nipple communicates with the interior of the milk hose via the interior of the balancing arm, and a pivot member, which via a joint member is connectable to the support arm at its said other end and which carries the balancing arm, wherein the balancing arm is movable relatively to the pivot member between a first position, at which the pivot member is located relatively close to the claw, and a second position, at which the pivot member is located relatively far from the claw, when the balancing arm is connected thereto, whereby the support arm supports the milking member and said portion of the milk hose via the pivot member and the balancing arm, when the pivot member and the balancing arm are connected in the milking equipment.

Suitably, an adjustment member for adjustment of the distance of the pivot member from the support shaft is connectable between said joint member and the support arm. The adjustment member may comprise a bar and a guide sleeve, in which the bar is displaceably provided, wherein the bar is connectable to said joint member and wherein the guide sleeve is connectable to the support arm.

Preferably, the pivot member comprises a sleeve, which is provided on the balancing arm and which is dimensioned to provide a radial play between the balancing arm and the sleeve. Hereby, the balancing arm may easily slide through the sleeve.

BRIEF DESCRIPTION OF THE DRAWINGS

The invention is more closely described in the following with reference to the drawings attached, in which FIG. 1 discloses a milking equipment according to the invention, in which a balancing device is adjusted to an application position, FIG. 2 discloses an enlarged detail of the balancing device in the milking equipment according to FIG. 1, FIG. 3 discloses the milking equipment during milking, FIG. 4 discloses the milking equipment when the teatcup remover is to remove the teatcups from the udder of an animal, and FIG. 5 discloses the milking equipment with a milking member in a preparedness position.

DETAILED DESCRIPTION OF THE DRAWINGS

Figure 3:
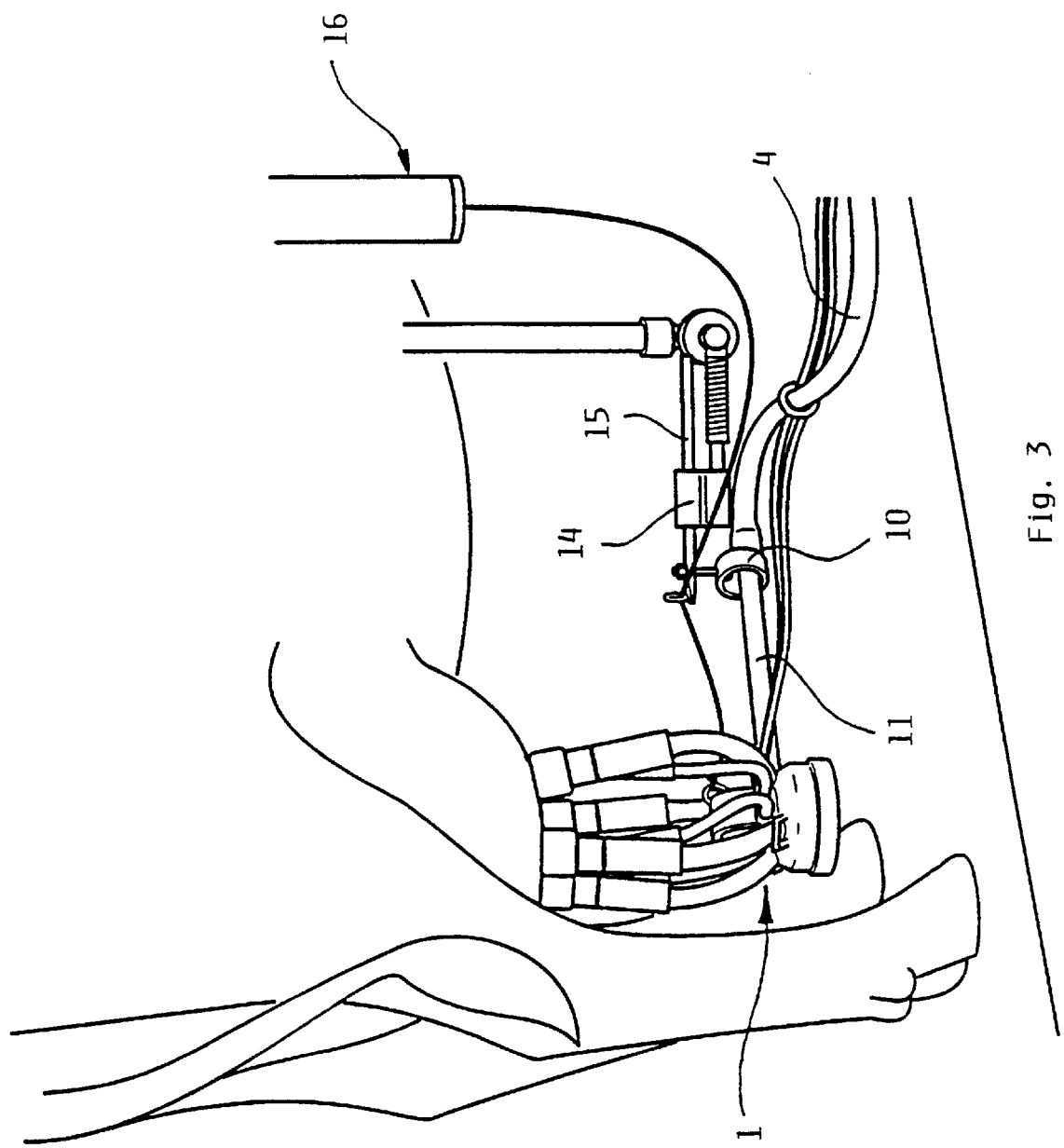

FIG. 1 discloses a milking equipment according to the invention, which comprises a milking member 1, having a claw 2 with a milk outlet nipple and teatcups 3 connected to the claw 2, a milk hose 4 connected to said milk outlet nipple, and a pair of pulse hoses 5 attached to the milk hose 4, and a stationary support member 6. The support member 6 comprises a vertical support shaft 7 and an essentially horizontal, resilient support arm 8, which at its one end is connected to the support shaft 7 and which at its other end is connected, via a joint member 9, to a sleeve-shaped pivot member 10. A tubular balancing arm is connected between the milk outlet nipple of the claw 2 and the milk hose 4 in such a manner that the interior of the milk outlet nipple communicates with the interior of the milk hose 4 via the interior of the tubular balancing arm 11. The pivot member 10 is provided on the balancing arm 11 and is dimensioned in such a manner that there is a radial play between the balancing arm 11 and the sleeve-shaped pivot member 10. The support member 6, the pivot member 10 and the balancing arm 11 form a balancing device, by which the weight of the milking member 1 and the weight of a portion of the milk hose 4 may be essentially balanced.

The support arm 8 comprises a portion 12, which has an arm 13, which at its one end is connected to the support shaft 7, and a guide sleeve 14, which is releasable connected to the arm 13 at its other end. Furthermore, the support arm 8 comprises a bar 15, which is displaceably provided in the guide sleeve 14, wherein the bar 15 is parallel to the arm 13. At its one end, the bar 15 is connected to the joint member 9.

In this case, the joint member 9 comprises a bolt having a bulging head which is introduced through a radial hole in the sleeve-shaped pivot member 10 and a hole in the bar 15 and which is provided with a self-locking nut, see FIG. 2. Alternatively, the joint member 9 may be designed in another manner. It is essential that the pivot member 10 is horizontally rotatable and somewhat pivotable in a vertical plane.

A teatcup remover 16 comprising a piston-cylinder member 17 and a drawing cord 18 is fixedly provided on a support not disclosed. The drawing cord 18 extends from the piston-cylinder member 17 to the claw 2 and is attached thereto. A guide opening 19, through which the drawing cord 18 extends, is attached to the bar 15 in the proximity of the joint member 9.

A milking space A is provided for an animal to be milked, wherein the support shaft 7 and the teatcup remover 16 are provided outside the milking space A.

Figure 5:
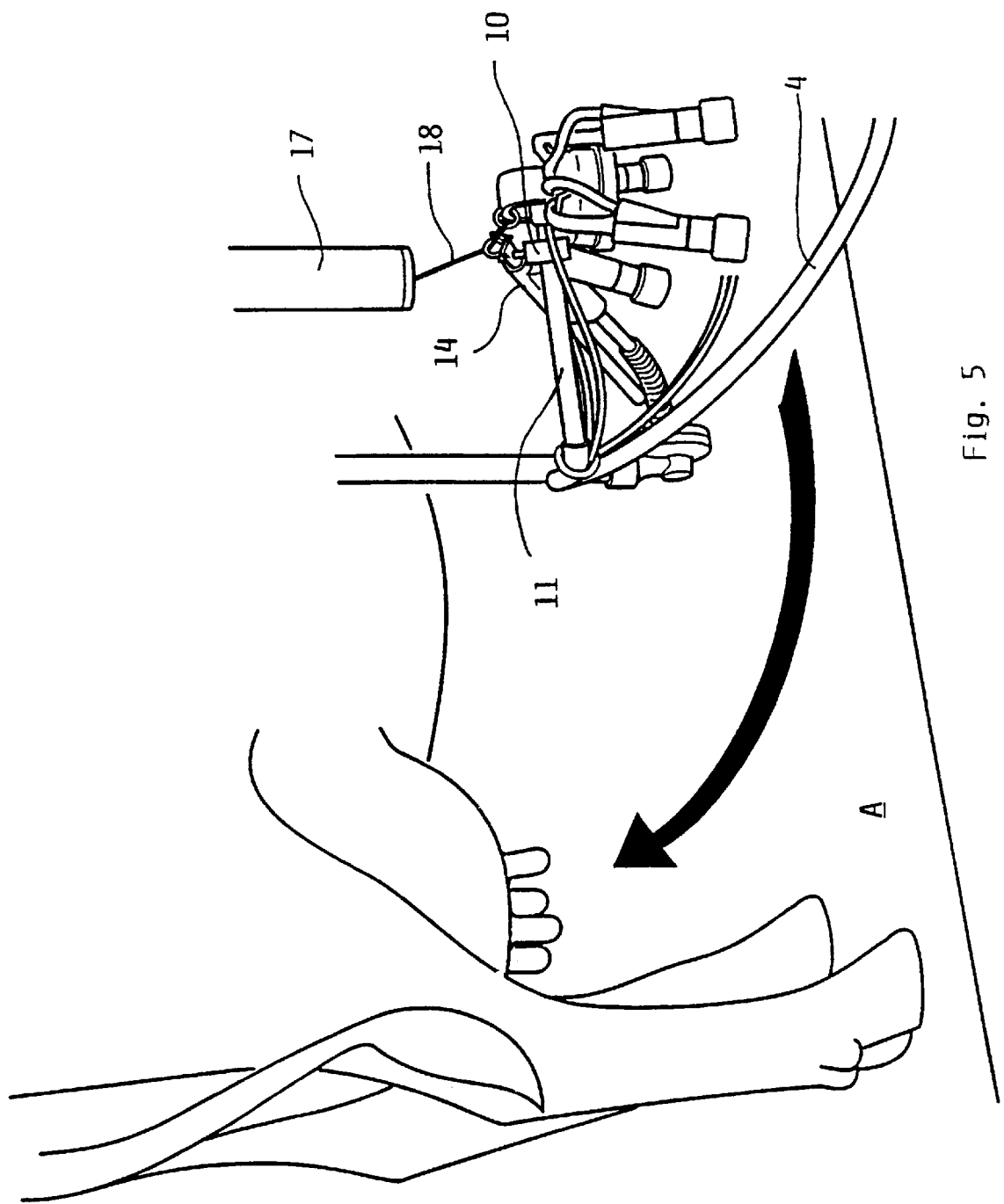

The milking equipment according to the invention, which is disclosed in the figures, is functioning in the following way. When an animal, for instance a cow, is located in the milking space A in order to be milked, the milker rotates, by means of the support shaft 7, the milking member 1 from a preparedness position (FIG. 5) in the milking space A to an operation position approximately beneath the udder of the cow. The milker adjusts the distance between the milking member 1 and the support shaft 7 by adjusting the position of the bar 15 in relation to the guide sleeve 14, in such a manner that the claw 2 is located straight beneath the teats of the cow. Here, the pivot member 10 is located on the balancing arm relatively close to the claw, wherein said balancing device is adjusted to an application position, which means that a portion of the milk hose 4 forms a counter weight to the weight of the milking member 1. (Also the weight of the pulse hoses 5 contributes somewhat to said counter weight). Consequently, essentially the weight of the milking member 1 and the weight of said portion of the milk hose 4 are balanced. This permits the milker to attach the teatcups 3 to the teats of the cow without the need for the milker to carry simultaneously the whole weight of the milking member 1. When the milker has attached all teatcups 3, the milker moves the pivot member 10 on the balancing arm 11 to a position, at which the pivot member 10 is located relatively far from the claw 2, see FIG. 3, wherein said balancing device is adjusted to a milking position. Hereby, essentially the whole weight of the milking member 1 will act on the teats of the cow, which gives a proper adjustment of the positions of the teatcups 3 on the teats.

Figure 4:
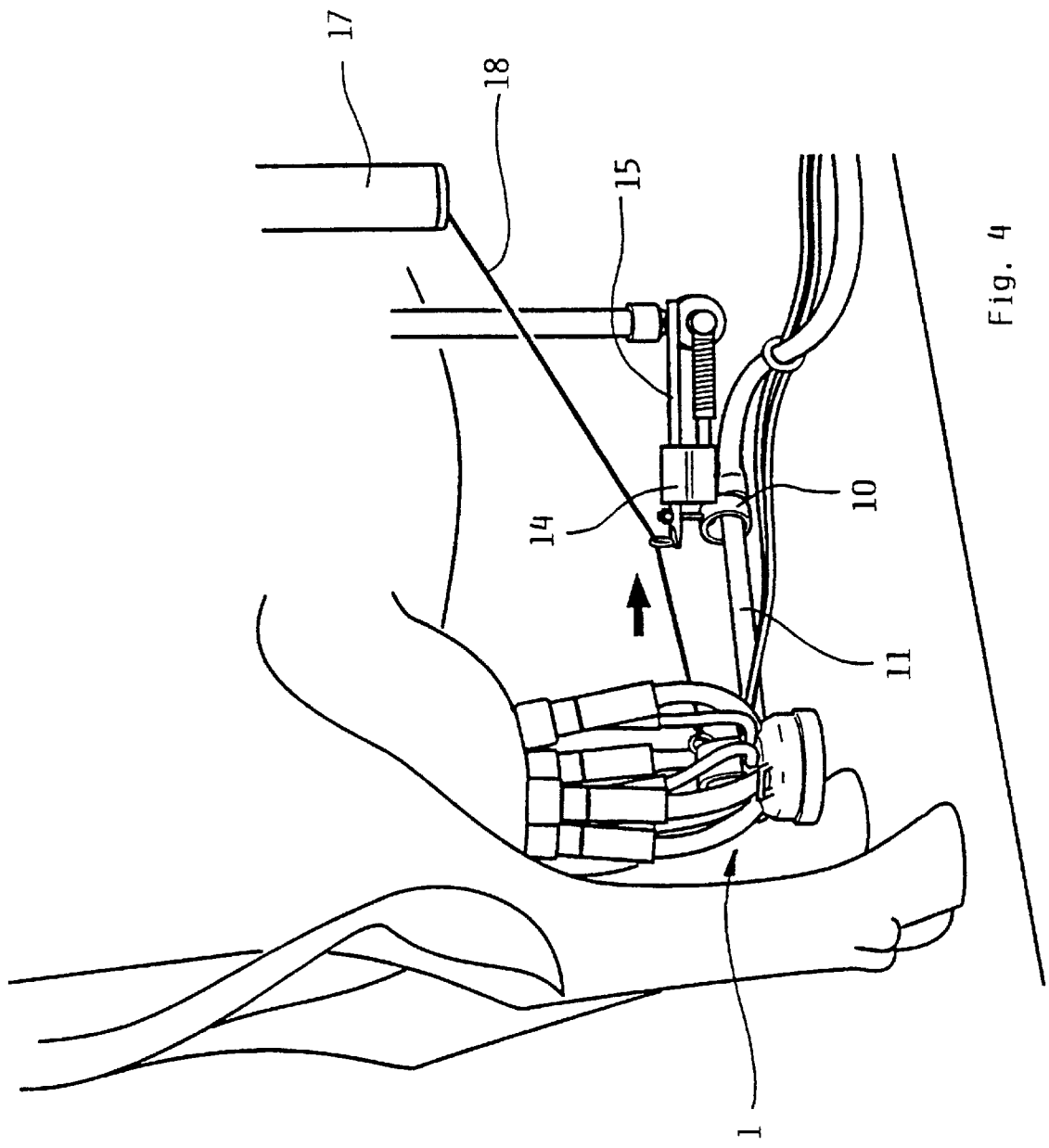

When the udder of the cow is emptied of milk, the teatcup remover 16 is activated in such a manner that the drawing cord 18 is pulled into the piston-cylinder member 17, see FIG. 4. Hereby, the drawing cord 18 in the first place pulls the balancing arm 11 through the pivot member 10 in such manner that the pivot member 10 is located at the position disclosed in FIG. 1, whereafter the milking member 1 is pulled off the udder and rotated by means of the support shaft 7 away from the milking space A to the preparedness position disclosed in FIG. 5. Also the hoses 4 and 5 are moved simultaneously away from the milking space A.

According to the invention, also a relief device comprising some of the components of the milking equipment described above according to FIG. 1–5 may easily be provided as a complement to certain known milking equipments which are already installed at milk farmers in order to facilitate the teatcup attachment. One such known milking equipment may be of the kind which has a stationary support member with a vertical support shaft and a support arm which extends essentially horizontally away from the shaft and which carries the milk and pulse hoses in the proximity of but at a distance from the milking member. After the milking is finished, the milker may by means of the support arm known rotate the milking member with connected hoses away from the animal which has been milked.

The known milking equipment described above may thus be supplemented by a relief device comprising a balancing arm 11, which is connected between the milk outlet nipple of the claw and the milk hose of the known milking equipment, the pivot member 10 and the joint member 9 connected to the support arm of the known milking equipment. Furthermore, the support arm of the known milking equipment may be provided with the guide sleeve 14 and the bar 15 in order to enable adjustment of the distance of the pivot member 10 from the support shaft of the known milking equipment. The known milking equipment supplemented by such a relief device is functioning in the same manner as is described above for the milking equipment according to FIG. 1–5.

Alternatively, the milking equipment according to the invention may be modified if it is desired to discharge the milk separately from each teat without mixing with milk from other teats. In this case, the balancing arm 11 is provided with separate milk passages which are connected to a respective teatcup. The milk hose 4 is replaced by a number of milk hoses, which are connected to a respective milk passage of the balancing arm 11, or provided with separate milk passages of the same number as the milk passages of the balancing arm 11.

What is claimed is:

1. A milking equipment comprising:
    a milking member having teatcups;
    at least one milk hose connected to the milking member; and
    a balancing device, wherein the milking member and at least a portion of the milk hose are supported by said balancing device, said balancing device being adjustable to an application position at which the balancing device is arranged to balance essentially the weight of the milking member and the weight of said portion of the milk hose in order to permit a milker to apply the teatcups to the teats of an animal without the need for the milker to carry simultaneously the whole weight of the milking member, and a milking position at which essentially the whole weight of the milking member acts on the teats of an animal when the teatcups are attached to the teats,
    said balancing device comprising a balancing arm having one end and another end, which at its one end is attached to the milking member and which at its other end carries said portion of the milk hose, a pivot member which carries the balancing arm, and a stationary support member which supports the pivot member, wherein the balancing arm is movable along its longitudinal direction in relation to the pivot member between a first position, which corresponds to the application position and at which the pivot member is located relatively close to the milking member, and a second position, which corresponds to said milking position and at which the pivot member is located relatively far from the milking member.

2. A milking equipment according to claim 1, wherein the balancing device is arranged to permit the movement of the milking member between an operation position, at which the milking member is located in a milking space and is attachable to an animal present in said milking space, and a preparedness position, at which the milking member is located outside said space.

3. A milking equipment according to claim 2, in which the teatcups are arranged to be removed from the teats of an animal after the milking is finished by means of an automatic teatcup remover, wherein the teatcup remover is provided to move the milking member from the operation position to the preparedness position, when the teatcup remover has removed the teatcups from the teats of the animal.

4. A milking equipment according to claim 3, wherein the teatcup remover is arranged to adjust the balancing device from the milking position to the application position during the movement of the milking member from the operation position to the preparedness position.

5. A milking equipment according to claim 1, wherein the balancing arm extends in an essentially horizontal direction and is moveable horizontally in relation to the pivot member between said first position and said second position.

6. A milking equipment according to claim 5, wherein the support member comprises a vertical support shaft and an essentially horizontal support arm, which at its one end is connected to the support shaft and which at its other end is articulated to the pivot member.

7. A milking equipment according to claim 6, wherein the support arm is adjustable between a first position, at which the pivot member is located relatively far from the support shaft, and a second position, at which the pivot member is located relatively close to the support shaft.

8. A milking equipment according to claim 7, wherein the support arm comprises a first portion which is connected to the support shaft, and a second position which is articulated to the pivot member and which is displaceable along said first portion of the support arm.

9. A milking equipment according to claim 5, wherein the pivot member comprises a sleeve which is provided on the balancing arm and which is dimensioned to provide a ridial play between the balancing arm and the sleeve.

10. A milking equipment according to claim 5, wherein the balancing arm forms at least one milk passage communicating with the interior of the teatcups and having an orifice at said other end of the balancing arm, and in that the milk hose is connected to the balancing arm at its other end in such a manner that the milk passage communicates with the interior of the milk hose.

11. A milking equipment according to claim 10, in which the milking member comprises a claw having a milk outlet, wherein the balancing arm at its said one end is connected to the claw in such a manner that the milk passage of the balancing arm communicates with the milk outlet.

12. A milking equipment according to claim 5, wherein an automatic teatcup remover is provided and has a drawing cord attached to the milking member, wherein the drawing cord extends through a guide opening on the support arm at said other end of the support arm.

13. A relief device for a milking equipment, comprising:
- a milking member, which has a claw with a milk outlet nipple and teatcups connected to the claw;
- a milk hose connected to said milk outlet nipple;
- a stationary support member, which has a vertical support shaft and an essentially horizontal support arm, which at its one end is connected to the support shaft and which at its other end carries at least a portion of the milk hose;
- a tubular balancing arm, which is connectable between the milk outlet nipple of the claw and the milk hose in such a manner that the interior of the milk outlet nipple communicates with the interior of the milk hose via the interior of the balancing arm; and
- a pivot member, which via a joint member is connectable to the support arm at its said other end and which carries the balancing arm, wherein the balancing arm is moveable in its longitudinal direction relatively to the pivot member between a first position, at which the pivot member is located relatively close to the claw, and a second position, at which the pivot member is located relatively far away from the claw when the balancing arm is connected thereto, whereby the support arm supports the milking member and said portion of the milk hose via the pivot member and the balancing arm when the pivot member and the balancing arm are connected in the milking equipment.

14. A device according to claim 13, wherein an adjustment member for adjustment of the distance of the pivot member from the support shaft is connectable between said joint member and the support shaft.

15. A device according to claim 14, wherein the adjustment member comprises a bar and a guide sleeve through which the bar is displaceable provided, wherein the bar is connectable to said joint member and wherein the guide sleeve is connectable to the support shaft.

16. A device according to claim 13, wherein the pivot member comprises a sleeve which is provided on the balancing arm and which is dimensioned to provide a radial play between the balancing arm and the sleeve.

* * * * *